Patented June 10, 1947

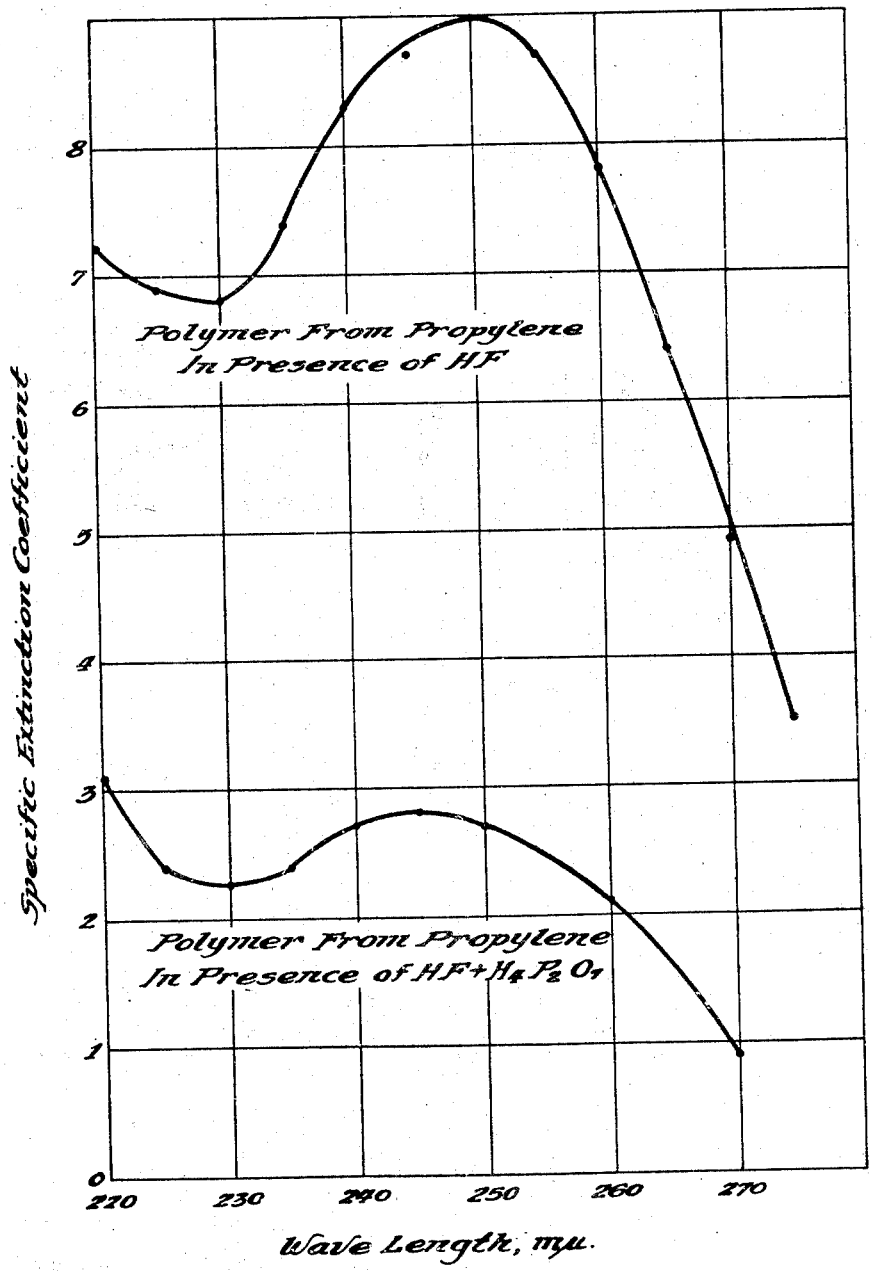

2,421,951

UNITED STATES PATENT OFFICE 2,421,951

POLYMERIZATION OF OLEFINIC HYDROCARBONS

Carl B. Linn, Riverside, Ill., assignor to Universal Oil Products Company, Chicago, Ill., a corporation of Delaware Application May 31, 1945, Serial No. 596,924

12 Claims. (Cl. 260—683.15)

This invention relates to the polymerization of olefinic hydrocarbons in the presence of a special type of catalyst. More particularly, this invention relates to the polymerization of propylene and butylenes into normally liquid hydrocarbons boiling within the approximate range of gasoline.

An object of this invention is to polymerize olefinic hydrocarbons in the presence of a liquid catalytic material.

Another object of this invention is to convert propylene and butylenes into normally liquid hydrocarbons in the presence of a liquid catalyst.

A further object of this invention is to polymerize olefinic hydrocarbons including mono-olefins and polyolefins in the presence of a catalyst mixture comprising hydrogen fluoride.

The single figure of the drawing is a chart in which certain properties of the product are plotted in the form of curves.

In one specific embodiment this invention relates to a process for producing hydrocarbons of higher molecular weight which comprises reacting an olefinic hydrocarbon having at least 3 carbon atoms per molecule at polymerizing conditions in the presence of liquid hydrogen fluoride and a compound soluble in said hydrogen fluoride and selected from the group consisting of the acids of phosphorus and their anhydrides and esters.

Another embodiment of this invention relates to a polymerization process which comprises reacting an olefinic hydrocarbon having at least 3 carbon atoms per molecule in the presence of a major proportion by weight of liquid hydrogen fluoride and a minor proportion by weight of a substantially non-oxidizing compound selected from the group consisting of the acids of phosphorus and their anhydrides and esters.

A further embodiment of this invention relates to a polymerization process which comprises reacting a mono-olefinic hydrocarbon having at least 3 carbon atoms per molecule in the presence of a liquid hydrogen fluoride catalyst having dissolved therein a minor proportion by weight of an acid of phosphorus.

Normally gaseous and liquid olefinic hydrocarbons which are polymerizable by the process of the present invention occur together with paraffinic or saturated hydrocarbons in commercial hydrocarbon mixtures such as those encountered in the cracking of petroleum, in gas making processes, and as by-products of various chemical industries. Normally gaseous mono-olefins, such as propylene and butylenes, and normally liquid olefins including amylenes, hexenes, and higher olefins, may be obtained also by catalytic dehydrogenation of paraffins, by pyrolysis of certain paraffinic hydrocarbons, and by dehydration of alcohols. Polyolefins and cyclic olefins are also olefinic hydrocarbons which may be polymerized in my process and these include particularly butadiene, isoprene, cyclohexene, alkyl cyclohexenes, etc.

In general, olefins have a relatively high activity and even under mild catalytic influence they exhibit this activity by their pronounced tendency to polymerize and form substances of higher molecular weights. This process is particularly effective for converting propylene and butylenes into normally liquid polymers.

The present process is directed particularly to the production of polymers containing from about 6 to about 12 and more carbon atoms per molecule from propylene and butylenes. The preferred polymer products boil at temperatures within the approximate boiling range of commercial gasoline. These polymers containing from about 6 to about 12 carbon atoms per molecule are useful for blending with straight-run gasoline to increase its antiknock value.

By the addition to liquid hydrogen fluoride of the herein described non-oxidizing acids, anhydrides, and esters, the ordinarily vigorous activity of hydrogen fluoride in catalyzing polymerization of olefins is moderated. Thus I have found that substantial yields of liquid polymers of relatively low molecular weights are produced when propylene, butylenes, and higher olefins are reacted at temperatures of from about −50° to about 250° C. but preferably at a temperature of from about 20° to about 150° C. in the presence of a catalyst comprising essentially a major proportion by weight of liquid hydrogen fluoride and a minor proportion by weight of an acid of phosphorus, its anhydride, or ester. The polymerization treatment is generally carried out at a pressure sufficient to maintain the reacting hydrocarbons and catalyst in substantially liquid phase. Also, the treatment of the olefinic charging stock in the presence of the catalyst utilizes a contact time of from about 40 seconds to as long as 5 hours, depending upon the nature of the olefinic charging stock and also upon the properties of the desired product. The acid of phosphorus, its anhydride or ester which is herein referred to as a spacing agent or diluent, is present to the extent of from about 1 to about 50% by weight of the hydrogen fluoride used.

Accordingly, the present invention deals with a hydrogen fluoride polymerizing catalyst of controlled activity which is modified by the addition to said hydrogen fluoride of a compound soluble therein and selected from the group consisting of the acids of phosphorus and their anhydrides and esters. The substantially non-oxidizing inorganic acids utilizable in the present process include acids of phosphorus, such as phosphorous, orthophosphoric, pyrophosphoric, and tetraphosphoric acids, more complex acids of phosphorus, the anhydrides of acids of phosphorus, and esters of the various acids of phosphorus.

The addition of these compounds or spacing agents to liquid hydrogen fluoride influences the polymerization of mono-olefinic hydrocarbons in such a way as to improve the yield and quality of relatively low boiling normally liquid hydrocarbons. In fact, the polymers formed in the presence of my catalyst mixture comprising hydrogen fluoride and a spacing agent differ considerably from polymers formed from the same olefinic charging stock but in the presence of substantially anhydrous hydrogen fluoride and in the absence of a spacing agent. In the presence of my mixed catalyst, mono-olefinic hydrocarbons are converted into polymers comprising essentially the mono-olefinic hydrocarbons, whereas in the presence of substantially anhydrous hydrogen fluoride, the same mono-olefinic hydrocarbon charging stock undergoes what may be termed conjunct polymerization and forms a complex mixture of hydrocarbons containing paraffins, olefins, cyclic hydrocarbons, and relatively high proportions of conjugated diolefinic hydrocarbons. The presence of conjugated diolefinic hydrocarbons in the polymer formed under the influence of hydrogen fluoride as the sole catalyst is evidenced by the so-called specific extinction coefficient obtained by ultra-violet absorption analysis of the hydrocarbon products. In order to interpret the results of these ultra-violet absorption analyses, use is made of the "specific extinction coefficient," which is equal to $$\frac{\log_{10}\frac{I_0}{I}}{CL}$$

where $I_0$=intensity of incident light (cell filled with iso-octane)
$I$=intensity of transmitted light (cell filled with solution of polymer in iso-octane solvent)
$C$=concentration of polymer in cell in grams per liter
$L$=length of cell path in centimeters Iso-octane, more exactly known as 2,2,4-trimethylpentane, is employed as the solvent since this octane gives substantially no ultra-violet absorption in the region examined.

Other work on various hydrocarbons of known structures has indicated that a hgh specific extinction coefficient denotes the presence in said hydrocarbons of a relatively high proportion of conjugated unsaturation.

My polymerization process may be carried out in a batch operation but it is effected preferably in continuous types of operation. In batch type treatment an olefinic hydrocarbon, and generally a mono-olefinic hydrocarbon or a hydrocarbon fraction containing mono-olefins, may be agitated with a mixture of hydrogen fluoride and a compound soluble therein and selected from the group consisting of the acids of phosphorus and their anhydrides and esters in an autoclave or other reactor of suitable design.

Continuous operation of my process may be carried out by passing a mixture of an olefin-containing hydrocarbon fraction and a mixture of hydrogen fluoride and a spacing agent through a suitable reactor or group of reactors, separating liquid polymers from unconverted olefins and catalyst mixture and recycling the unconverted olefins and catalyst mixture to the polymerization zone of the process. It is usually necessary to include a cooling zone or other heat exchange means in the polymerization zone or between such zones if a multiple polymerization reactor system is employed.

From the statements hereinabove set forth concerning the types of substantially non-oxidizing compounds which may be employed as diluents or spacing materials for hydrogen fluoride, it will be evident that a large number of catalyst composites of various compositions may be made according to the needs of different polymerization reactions but the different diluents or spacing agents are not necessarily equivalent in their action.

While in many cases the activity of the composite polymerizing catalyst employed is due principally to the hydrogen fluoride contained therein, it is recognized that the substantially non-oxidizing compounds added thereto may at times exert a definite chemical influence upon the reactions other than merely moderating the effect of the hydrogen fluoride. It is also evident that the selection of any particular diluent or mixture of diluents for use with hydrogen fluoride is determined largely by solubility relations, the ease of polymerizing the olefinic hydrocarbons involved, the general operating conditions, and the matter of economy in the cost of the reagents.

The following example is given to indicate results obtained by the present process, although with no intention of limiting the scope of the invention in exact correspondence with the numerical results.

150 grams of propylene, 74 grams of liquid hydrogen fluoride of 99% concentration, and 20 grams of pyrophosphoric acid were contacted at 95° C. for 2 hours in an autoclave equipped with a pressure-sealed stirring device. The reaction product resulting from this treatment was separated into a hydrocarbon layer and a used catalyst layer. The liquid hydrocarbon product which had about the same weight as that of the propylene charged was washed with caustic soda solution and with water and was then distilled to remove a gasoline fraction of 204° C. end point. The washed and dried polymer had a refractive index, $n_D^{20}$, of 1.4440, a fluorine content of 0.37% by weight, a bromine number of 37, and an average molecular weight of 236.

The reaction product from this run was also subjected to an ultra-violet absorption analysis in which the specific extinction coefficients were determined for wave lengths between 220 and 275 m$\mu$. These results which are expressed graphically in the attached drawing show that the polymer formed in the presence of my composite catalyst is less complex and contains a lower percentage of conjugated double bonds than present in similar polymer produced at the same reaction temperature in the presence of anhydrous hydrogen fluoride. The operating conditions used in these runs with the hydrogen fluoride-pyrophosphoric acid catalyst and with hydrogen fluoride alone and also a summary of the results obtained in these runs are given in the following table.

Table

| Run No. | 1 | 2 |
|---|---|---|
| Temperature, °C | 95 | 95 |
| Contact Time Hours | 2 | 2 |
| Charged grams: | | |
| Propylene | 150 | 150 |
| Hydrogen Fluoride | 74 | 87 |
| Pyrophosphoric Acid | 21 | 0 |
| Recovered Liquid | (1) | (2) |
| Properties of Hydrocarbon Product: | | |
| $n_D^{20}$ | 1.4440 | 1.4567 |
| Wt. per cent Fluorine | .37 | .12 |
| Bromine number | 37 | 79 |
| Molecular weight | 236 | 240 |
| Calc. Br. Number for found M. W. | 67 | 67 |
| Wt. per cent 204° C. E. P. Gasoline | 22 | 22 |
| Ultra-violet absorption analysis | Specific Extinction Coefficient | |
| Wave Length mµ— | | |
| 220 | 3.1 | 7.2 |
| 225 | 2.4 | 6.9 |
| 230 | 2.3 | 6.8 |
| 235 | 2.4 | 7.4 |
| 240 | 2.7 | 8.3 |
| 245 | 2.8 | 8.7 |
| 250 | 2.7 | 9.0 |
| 255 | | 8.7 |
| 260 | 2.1 | 7.8 |
| 265 | | 6.4 |
| 270 | 0.9 | 4.9 |
| 275 | | 3.5 |

1 The liquid product, after allowing for losses, was equal to the propylene charged except for a trace of the propylene, (less than 1%) which was converted to isopropyl fluoride.
2 Same as note (1) except that 3%, on a molar basis, of the propylene charged was converted to isopropyl fluoride.

The foregoing specification and example indicate the character of the process of the present invention and the nature of the results obtained, although neither section is introduced to unduly limit the generally broad scope of the invention.

I claim as my invention:

1. A conversion process which comprises polymerizing an olefinic hydrocarbon having at least 3 carbon atoms per molecule in the presence of a catalyst comprising a major proportion by weight of liquid hydrogen fluoride having dissolved therein a minor proportion by weight of a substantially non-oxidizing compound soluble in liquid hydrogen fluoride and selected from the group consisting of the acids of phosphorus and their anhydrides and esters.

2. A conversion process which comprises polymerizing an olefinic hydrocarbon having at least 3 carbon atoms per molecule in the presence of a catalyst comprising a major proportion by weight of liquid hydrogen fluoride having dissolved therein a minor proportion by weight of an acid of phosphorus.

3. A conversion process which comprises polymerizing an olefinic hydrocarbon having at least 3 carbon atoms per molecule in the presence of a catalyst comprising a major proportion by weight of liquid hydrogen fluoride having dissolved therein a minor proportion by weight of a phosphoric acid.

4. A conversion process which comprises polymerizing an olefinic hydrocarbon having at least 3 carbon atoms per molecule in the presence of a catalyst comprising a major proportion by weight of liquid hydrogen fluoride having dissolved therein a minor proportion by weight of pyrophosphoric acid.

5. A conversion process which comprises polymerizing an olefinic hydrocarbon having at least 3 carbon atoms per molecule at a temperature of from about −50° to about 250° C. in the presence of a catalyst comprising a major proportion by weight of liquid hydrogen fluoride having dissolved therein a minor proportion by weight of a substantially non-oxidizing compound selected from the group consisting of the acids of phosphorus and their anhydrides and esters.

6. A conversion process which comprises polymerizing a mono-olefinic hydrocarbon having at least 3 carbon atoms per molecule at a temperature of from about −50° to about 250° C. in the presence of a catalyst comprising a major proportion by weight of liquid hydrogen fluoride having dissolved therein a minor proportion by weight of a substantially non-oxidizing compound selected from the group consisting of the acids of phosphorus and their anhydrides and esters.

7. A conversion process which comprises polymerizing a mono-olefinic hydrocarbon having at least 3 carbon atoms per molecule at a temperature of from about −50° to about 250° C. in the presence of a catalyst comprising a major proportion by weight of liquid hydrogen fluoride having dissolved therein a minor proportion by weight of an acid of phosphorus.

8. A conversion process which comprises polymerizing a mono-olefinic hydrocarbon having at least 3 carbon atoms per molecule at a temperature of from about −50° to about 250° C. in the presence of a catalyst comprising a major proportion by weight of liquid hydrogen fluoride having dissolved therein a minor proportion by weight of a phosphoric acid.

9. A conversion process which comprises polymerizing a mono-olefinic hydrocarbon having at least 3 carbon atoms per molecule at a temperature of from about −50° to about 250° C. in the presence of a catalyst comprising a major proportion by weight of liquid hydrogen fluoride having dissolved therein a minor proportion by weight of pyrophosphoric acid.

10. A conversion process which comprises polymerizing an olefinic hydrocarbon having at least 3 carbon atoms per molecule at a temperature of from about 20° to about 150° C. and at a pressure sufficient to maintain in liquid state a substantial proportion of the reacting hydrocarbons in the presence of a catalyst comprising a major proportion by weight of liquid hydrogen fluoride having dissolved therein a minor proportion by weight of a substantially non-oxidizing compound selected from the group consisting of the acids of phosphorus and their anhydrides and esters.

11. A conversion process which comprises polymerizing a mono-olefinic hydrocarbon having at least 3 carbon atoms per molecule at a temperature of from about 20° to about 150° C. and at a pressure sufficient to maintain in liquid state a substantial proportion of the reacting hydrocarbons in the presence of a catalyst comprising a major proportion by weight of liquid hydrogen fluoride having dissolved therein a minor proportion by weight of a substantially non-oxidizing compound selected from the group consisting of the acids of phosphorus and their anhydrides and esters.

12. A conversion process which comprises polymerizing a mono-olefinic hydrocarbon having at least 3 carbon atoms per molecule in the presence of a catalyst comprising a major proportion by weight of liquid hydrogen fluoride having dissolved therein a minor proportion by weight of pyrophosphoric acid at a temperature of from about 20° to about 150° C. and at a pressure sufficient to maintain in liquid state a substantial proportion of said mono-olefinic hydrocarbon and hydrogen fluoride.

CARL B. LINN.

REFERENCES CITED

The following references are of record in the file of this patent:

UNITED STATES PATENTS

| Number | Name | Date |
| --- | --- | --- |
| 2,181,640 | Deanesly et al. | Nov. 28, 1939 |
| 2,317,694 | Ott | Apr. 27, 1943 |